United States Patent [19]

Elmore et al.

[11] Patent Number: 4,900,430
[45] Date of Patent: Feb. 13, 1990

[54] SCREEN CLEANING IN CIL AND CIP SYSTEMS

[75] Inventors: Carl L. Elmore; Phillip Mitchell, both of Glens Falls, N.Y.

[73] Assignee: Kamyr, Inc., Glens Falls, N.Y.

[21] Appl. No.: 778,265

[22] Filed: Sep. 20, 1985

[51] Int. Cl.[4] .............................................. B01D 33/00
[52] U.S. Cl. ..................................... 209/17; 209/269; 209/317; 209/346; 209/360; 210/384; 210/388
[58] Field of Search ................. 209/269, 17, 324, 360, 209/243, 313, 317, 346, 158, 159; 210/388, 384

[56] References Cited

U.S. PATENT DOCUMENTS

| | | | |
|---|---|---|---|
| 3,870,640 | 3/1975 | Reece | 210/388 |
| 4,033,863 | 7/1977 | Stone | 209/159 |
| 4,041,560 | 8/1977 | Jacobsen . | |
| 4,251,352 | 2/1981 | Shoemaker . | |
| 4,368,628 | 1/1983 | Jacobsen | 210/388 X |
| 4,416,774 | 11/1983 | Taylor . | |

Primary Examiner—Andres Kashnikow
Attorney, Agent, or Firm—Nixon & Vanderhye

[57] ABSTRACT

In carbon-in-pulp (CIP) and carbon-in-leach (CIL) processes, especially those utilizing pure oxygen instead of normal air to increase the overall efficiency of the cyanide leaching-adsorption process in the recovery of gold and/or silver from ores, the screen within each tank which surrounds the slurry outlet is kept clean. The cleaning action is accomplished by linearly reciprocating the screen first slowly in one direction, and then quickly in another (to cause back flushing); or by rotating a cleaning rotor on the inside of a cylindrical screen. The cleaning rotor may be connected to the same shaft as an agitator disposed above a draft tube within the tank. The screen surface is tapered in its direction of movement, and during movement has a tendency to transport and concentrate the carbon (charcoal) particles at the far end of the slow stroke, and the concentrated particles can be withdrawn and recirculated to other tanks in the system.

7 Claims, 9 Drawing Sheets

SCREEN CLEANING IN CIL AND CIP SYSTEMS

BACKGROUND AND SUMMARY OF THE INVENTION

In co-pending application Ser. No. 732,637 filed May 10, 1985, the disclosure of which is incorporated by reference herein, procedures and apparatus for efficiently recovering gold and/or silver from ores utilizing oxygen gas (instead of normal air) in a cyanide leaching-adsorption process are disclosed. In such procedures, typically a plurality of tanks are interconnected together, each tank having a slurry inlet and a slurry outlet, with a screen surrounding the slurry outlet. The screen functions to screen the activated charcoal (carbon) particles out so that they do not pass with the slurry into the slurry outlet. The inventory of charcoal particles is transferred from one vessel to the next in the opposite direction of the flow of pulp during treatment, with carbon discharged from the first vessel in the series ultimately being passed to a gold and/or silver recovery station, while the pulp discharged from the last vessel in the series is leach residue, which can be disposed of.

Existing carbon-in-pulp (CIP) and carbon-in-leach (CIL) process experience operating difficulties due to plugging of the carbon screens, however. Normally, the material which plugs the screens is not the charcoal particles, but rather stringy material, such as extraneous wood and plastic which has been thoroughly beaten and softened by passage through a ball mill. In normal operations, maintenance workers clean the screens by hand, and this is a simple procedure that may not require shutdown. However in CIL and like systems which utilize oxygen instead of normal air to facilitate leaching, such as shown in said copending application Ser. No. 732,637, cleaning the screens by hand would be difficult and dangerous. The tank covers required to maintain the oxygen environment would be in the way, and working in high oxygen content environments can be risky. Therefore it is desirable to provide some means of self-cleaning the screens in such oxygen CIL and CIP processes.

According to one aspect of the present invention, apparatus is provided for use in separating metal, particular gold and/or silver, and other values from a slurry, preferably a cyanide slurry of gold and/or silver ore particles, by adsorption with particles, preferably activated charcoal (i.e. carbon) granules. The apparatus includes a tank for holding the slurry containing the values (precious metal) to be separated, and a number of particles (carbon) on which the values are to be adsorbed, the tank having a slurry inlet and a slurry outlet. According to the present invention, a screen surrounds the slurry outlet, and means are provided for linearly reciprocating the screen to provide a self-cleaning action thereof due to back flushing of the screen. The screen is moved slowly in a first direction, and at the end of travel is then moved very quickly in the opposite direction. During movement in the second direction, the back flushing action occurs. If necessary or desirable, gas relief means can be provided, and also the screen is preferably tapered in the direction of movement By providing the tapered screen, it is possible to utilize the screen to additionally transport and concentrate charcoal particles at the end of travel of the screen in the first direction thereof. A suction pipe, or the like, for recirculating the carbon particles to other tanks may be provided at the area of concentrated particles adjacent the first end of travel of the screen so that the carbon flow can be minimized. The screen may have a wide variety of configurations, such as a conical configuration, and bearings for guiding the reciprocation can be provided at one or both ends thereof.

According to another aspect of the present invention, the tank includes a vertically extending draft tube which has an open bottom and open top. A shaft rotatable about a vertical axis extends through the top of the tank, and has agitator blades disposed above the draft tube. The screen for the slurry outlet preferably comprises a hollow cylindrical body which is concentric with the shaft, and interiorly of the screen a screen cleaning rotor is connected to the shaft. In that way, as the shaft rotates circulation of slurry and/or particles within the tank is effected by the slurry being drawn upwardly through the draft tube, and the screen is continuously kept free of clogging materials. The rotor may comprise a plurality of generally vertically extending circumferentially spaced blades, or a screw.

According to another aspect of the present invention, a process for effecting the recovery of gold and/or silver from a slurry of ore or the like is provided. The process includes the conventional steps of leaching gold and/or silver from the ore utilizing a basic cyanide solution, and recovering the leached gold and/or silver in solution by contacting the slurry with solid material adsorbing particles (e.g. charcoal particles). The recovering step is preferably practiced by providing oxygen gas in the slurry in an amount significantly greater than can be obtained by contacting the slurry with air, as disclosed in said co-pending application Ser. No. 732,637, and additionally the process also includes the step of back flushing the screen surrounding the slurry outlet of each tank in the recovery process, to keep the screens clean. The back flushing can be accomplished utilizing the apparatus described above.

It is the primary object of the present invention to provide an apparatus and process facilitating CIP and CIL processes utilizing oxygen gas, and screens surrounding tank slurry outlets. This and other objects of the invention will become clear from an inspection of the detailed description of the invention, and from the appended claims.

DETAILED DESCRIPTION OF THE DRAWINGS

Figure 1:
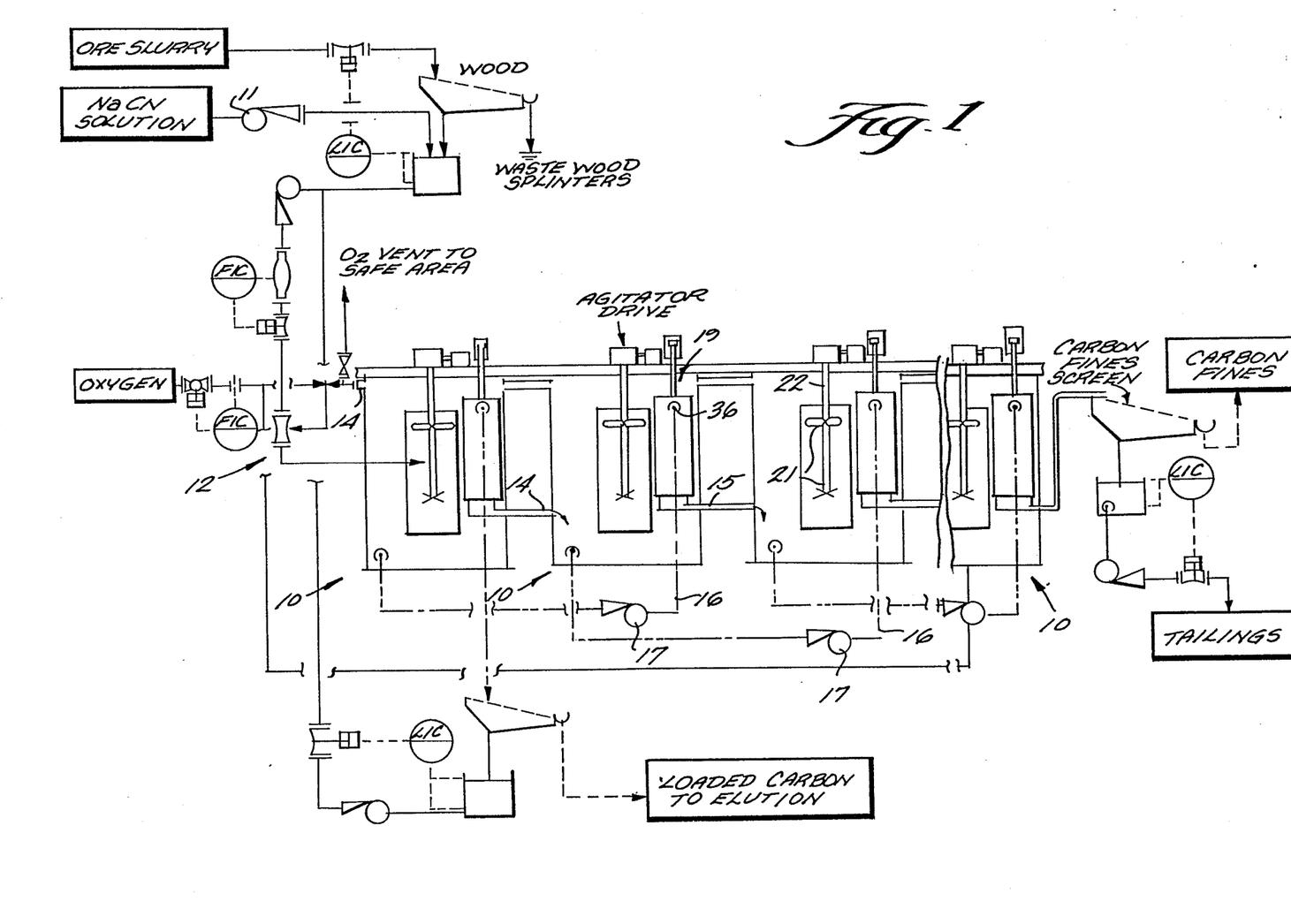
FIG. 1 is a schematic view, with parts of some components shown in cross-section, of exemplary apparatus for practicing a CIL process according to the present invention.

FIG. 1 schematically illustrates an exemplary CIL system according to the present invention, including a plurality of tanks 10 interconnected with each other, with a source of ore slurry, a cyanide solution, oxygen, and various disposal and recovery components. Metering pump 11 provides cyanide solution to be mixed with the screened ore slurry, and oxygen containing gas (preferably pure oxygen gas) is injected by oxygen injector 12. The tanks 10, only some of which are shown and any number of which may be provided, are interconnected so that each includes a slurry inlet 14 and a slurry outlet 15, the slurry outlet from each tank in the series being connected as the slurry inlet to the next tank in series. Also carbon particles recirculation is provided by recirculating system 16, including pumps 17, so that the carbon particles pass in the direction opposite to that of the slurry. The loaded carbon is passed to elution, while the tailings are disposed of or otherwise treated in an appropriate manner.

Figure 18:
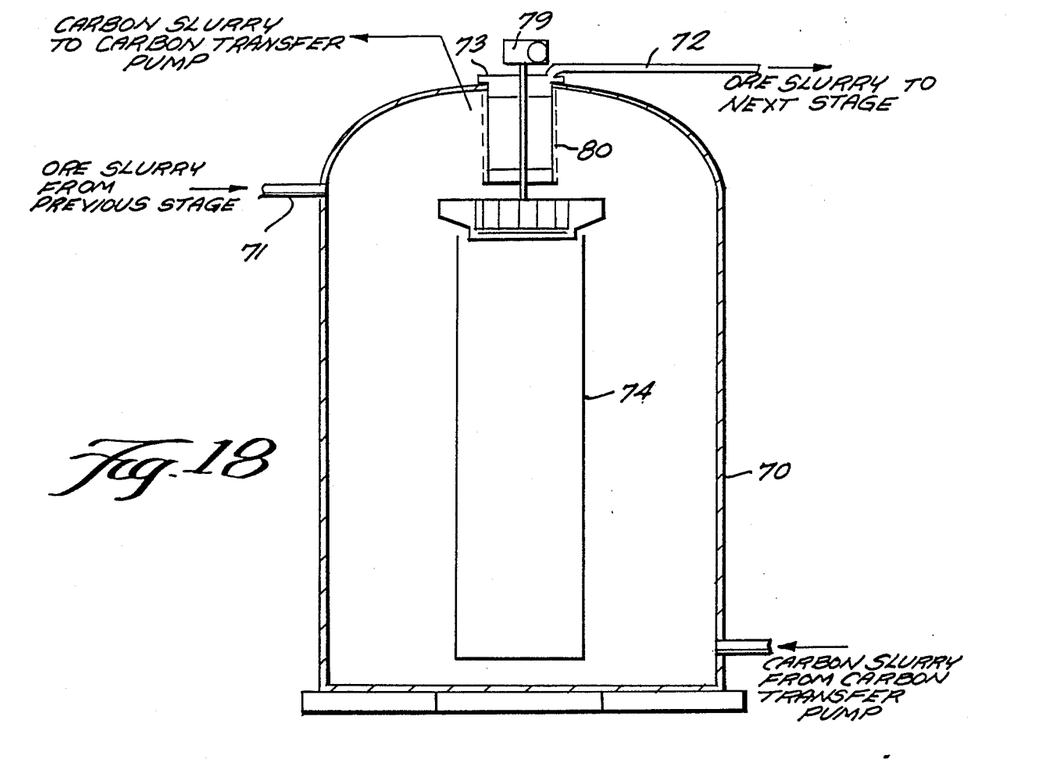
FIG. 18 is a side view of another exemplary form that a tank according to the present invention may take, with the side wall cut away for clarity of illustration.
Figure 19:
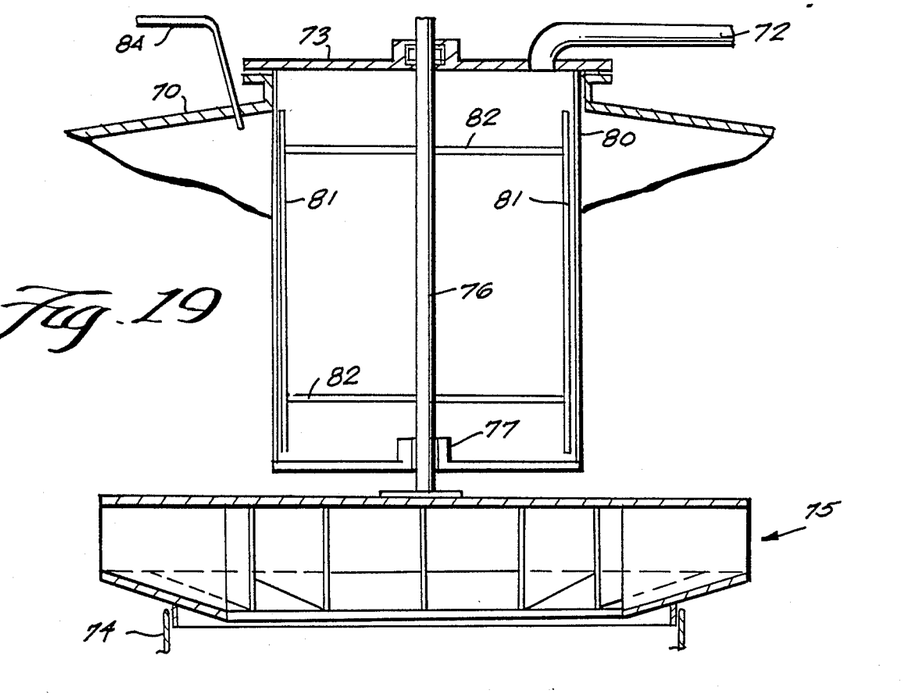
FIGS. 19 and 20 are detail side cross-sectional views of two different embodiments of screens, with screen cleaning means, utilizable in the tank of FIG. 18.
Figure 20:
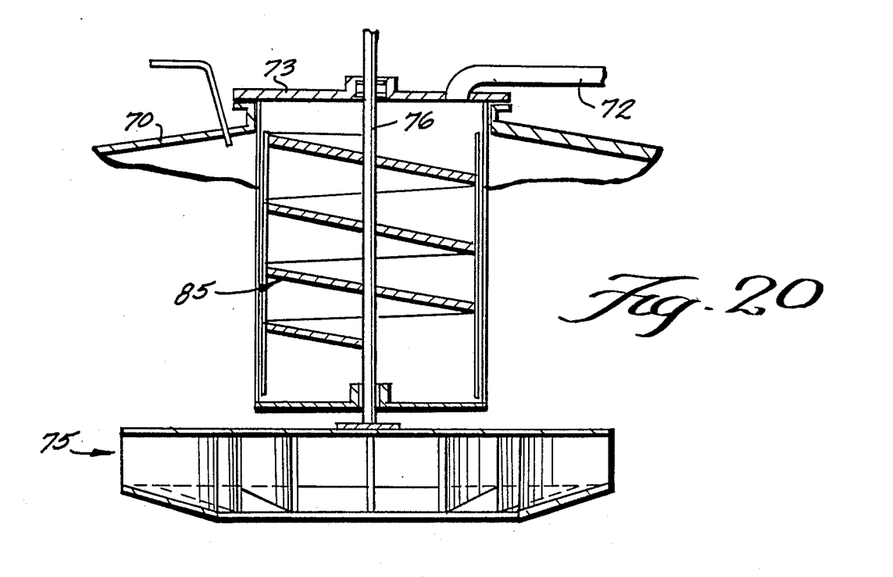

Disposed within each tank 10 operatively surrounding the slurry outlet 15 is a screen 19. The screen 19 may take a wide variety of forms. One specific form is illustrated most clearly in FIGURES 2, 3, and 5 through 8, while another embodiment is illustrated in FIGS. 10 through 14, yet another one in FIG. 15, and still another in FIGS. 16 and 17. FIGS. 18 through 20 show a different approach to screen cleaning utilizing a different type of screen surrounding the slurry outlet.

For the embodiment illustrated in FIGS. 2, 3, and 5 through 8, a draft tube 20 is disposed concentric with and interiorly of the tank 10, the draft tube 20 having an open top and an open bottom and facilitating the circulation of slurry and/or particles within the tank 10 through the bottom of the tube 20, and then upwardly through the top thereof. A conventional agitator 21, powered by a shaft 22, is disposed interiorly of draft tube 20. A motor 23, operating through gear reducer 24, rotates the shaft 22, the elements 23, 24 being mounted on top of the tank 10. Also mounted on top of the tank 10 is a screen actuator assembly 25. The screen actuator assembly preferably comprises a hydraulic piston and cylinder which effects linear reciprocation of the screen body 26.

The screen body 26 is a perforated, preferably metal, hollow member, the perforations therein being dimensioned so that they allow passage of the ore slurry therethrough, but substantially prevent the passage of the charcoal particles or the like that are disposed within the tank 10 for adsorbing the metal in the slurry. Preferably, as illustrated most clearly in FIGS. 6 through 8, the screen body 26 is connected through a square-crosssection solid metal sleeve 27 to a block 28 which in turn is connected to the piston rod 29 of the hydraulic piston and cylinder assembly 25. Interior supports 30 are provided for the screen body 26 to prevent it from collapsing. At the bottom of the screen body 26 another solid material sleeve 31 is provided, this surrounding a bearing structure 32 which extends upwardly from the top surface of the outlet pipe 15, the top surface having perforations 33 formed therein. A polymeric composite material which functions as both a bearing and a seal is illustrated by reference numeral 34 in FIGS. 6 through 8, and is disposed as a ring around the upstanding bearing 32, for cooperating with the interior surface of the screen end sleeve 31.

The hydraulic cylinder and piston assembly 25 operates to reciprocate the screen 26 slowly in a first direction (upwardly in the embodiment illustrated in FIGS. 5 and 6), and then quickly in the opposite direction (downwardly in the embodiment illustrated in the drawings). During the slow upward movement the screen body 26 acts just like a normal screen, whereas in the very fast downward reciprocation back flushing of liquid within the hollow interior of the screen body 26 takes place, unclogging any clogged perforations in the screen body 26. While the invention is described with respect to a vertical orientation, it is to be understood that it may have any desired orientation.

Figure 9A:
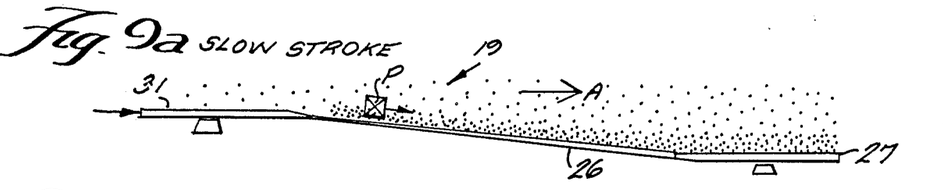
FIGS. 9a–9g show step by step movement of a reciprocating screen according to the present invention, and how such linear reciprocation thereof effects transportation and concentration of carbon particles at one end of the screen travel.
Figure 9B:
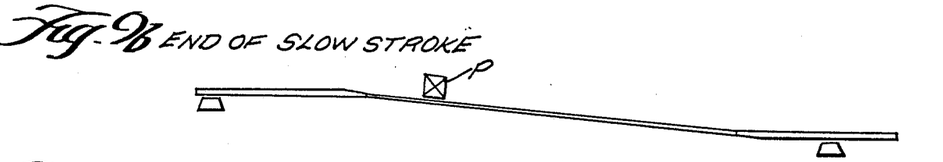
Figure 9C:
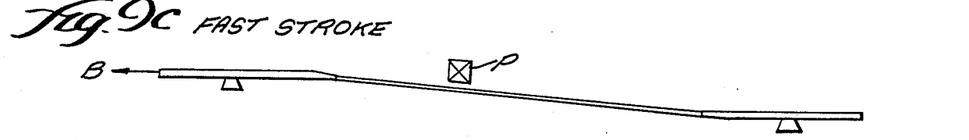
Figure 9D:
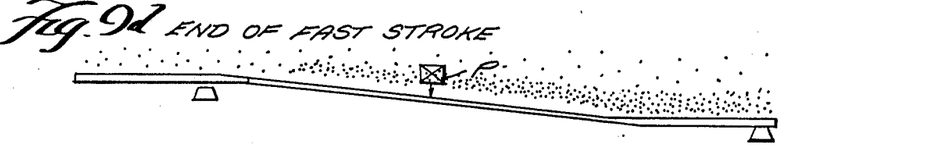
Figure 9E:
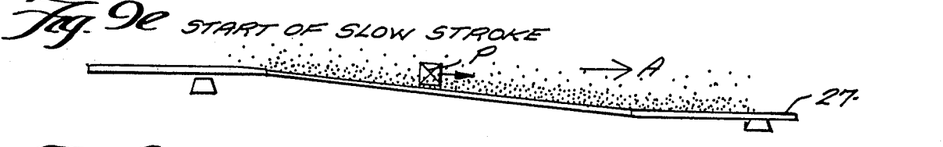
Figure 9F:
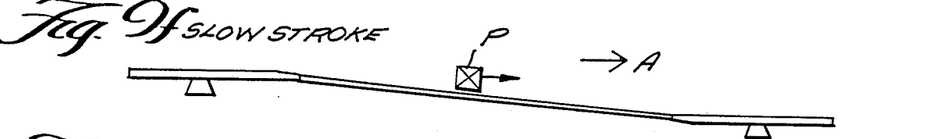
Figure 9G:
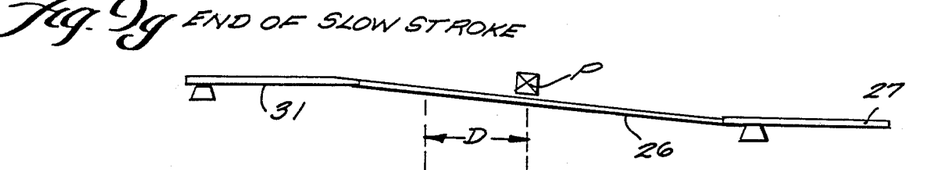
Figure 10:
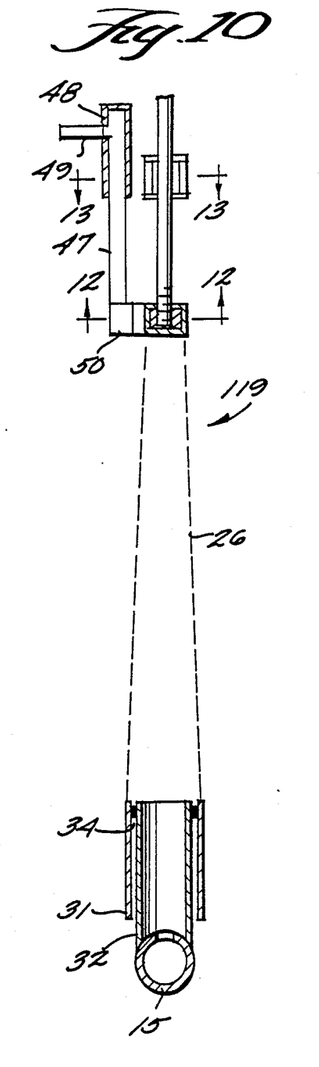
FIG. 10 is an end view, partly in cross-section and partly in elevation, of another embodiment of an exemplary screen according to the invention, having gas relief means.
Figure 11:
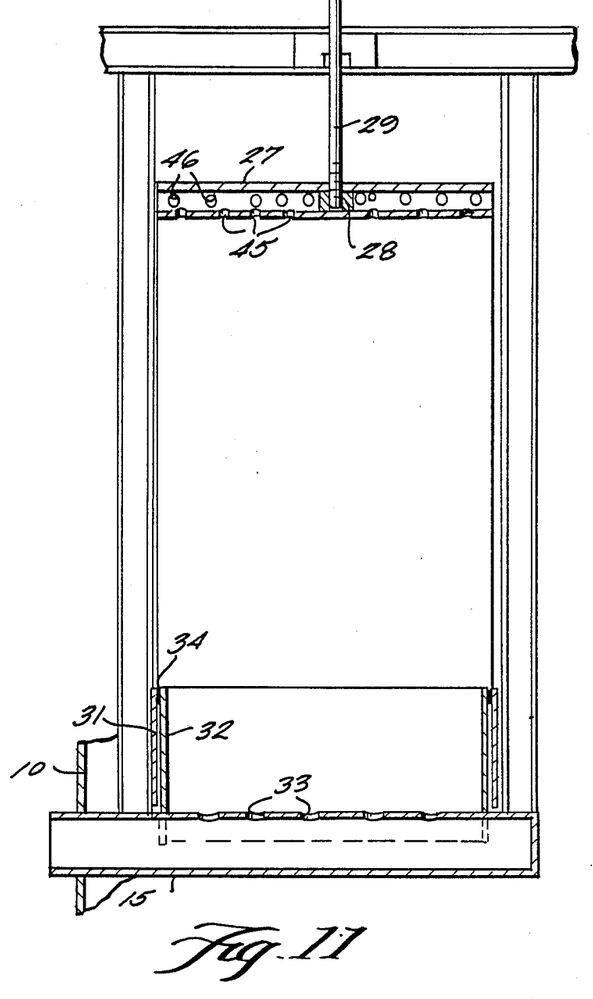
FIG. 11 is a side view, partly in cross-section and partly in elevation, of the screen of FIG. 10.
Figure 12:
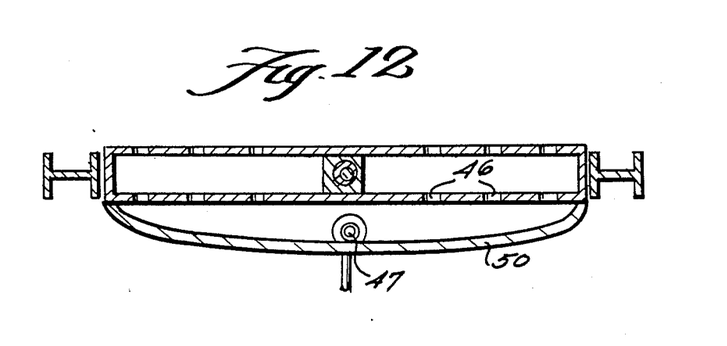
FIGS. 12 and 13 are cross-sectional views of the screen of FIG. 10 taken along lines 12-12, and 13—13 thereof.

Note that the screen body 26 tapers inwardly in the direction movement in the slow direction; that is the screen body 26 tapers so that it has a smaller cross-section at sleeve 27 than it does at sleeve 31. This is to facilitate back flushing, and — as seen with respect to FIGS. 9a–9g which show the movement of the screen first in the slow direction A, and then in the fast direction B — individual particles P of the charcoal particles or the like that comprise the adsorbing material in the tank 10 are transported. Note that from one end of the slow stroke to the other (compare FIGS. 9b and 9g), the reference particle P has moved the distance D. In this way, the reciprocation of the screen transports the adsorbing material particles in the direction A so that they are concentrated adjacent the sleeve 27. It is desirable, in order to reduce the amount of carbon flow, to then provide the suction tube 36 (see FIG. 1) for line 16 so that it is adjacent the end of the screen assembly 19 at which the particles concentrate.

Note that the tank 10 of FIGS. 1 through 3 and 5 has a closed top including a first generally rigid section 37, and a second section 38 that is hinged by hinges 39 to the stationary section 37. The top 37, 38 prevents the oxygen gas from leaking from the tank 10, and maintains the oxygen environment within the tank, but the hinged portion 38 allows access to the interior components for necessary repair, etc.

Figure 4:
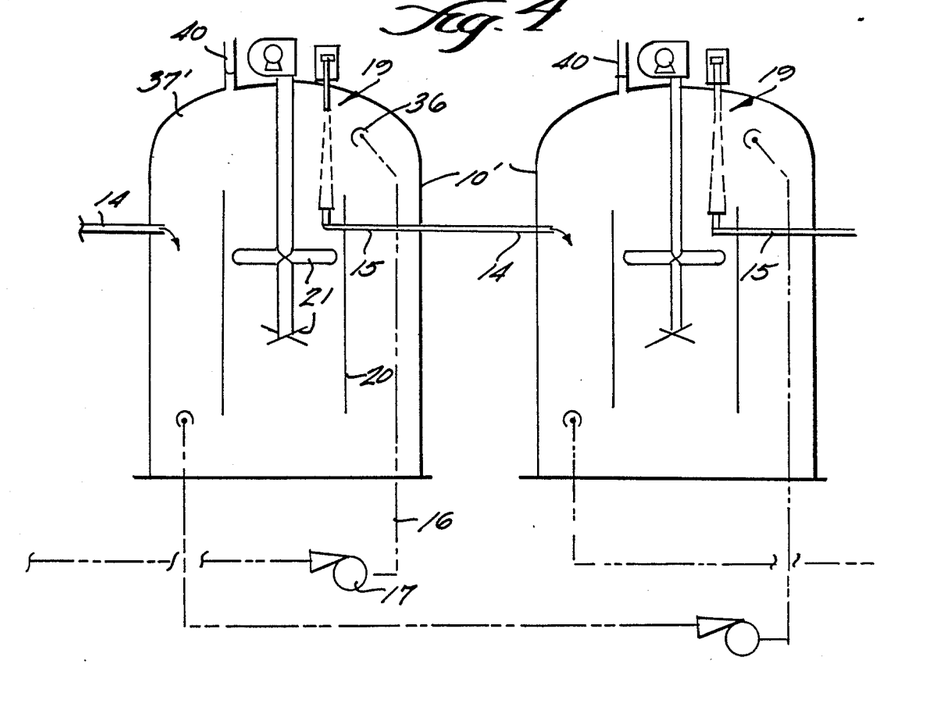
FIG. 4 is a side schematic view of an alternative construction of tanks utilizable in the system of FIG. 1.
Figure 5:
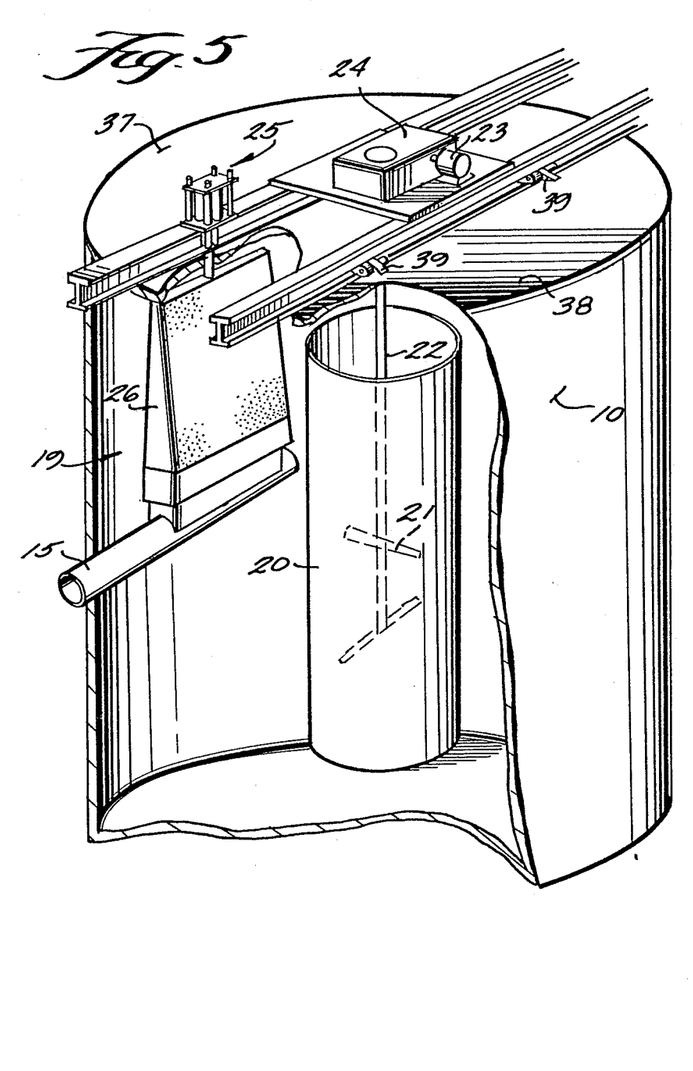
FIG. 5 is a schematic perspective view, with major portions of the tank cut away for clarity of illustration, of the tank of FIGS. 2 and 3.
Figure 6:
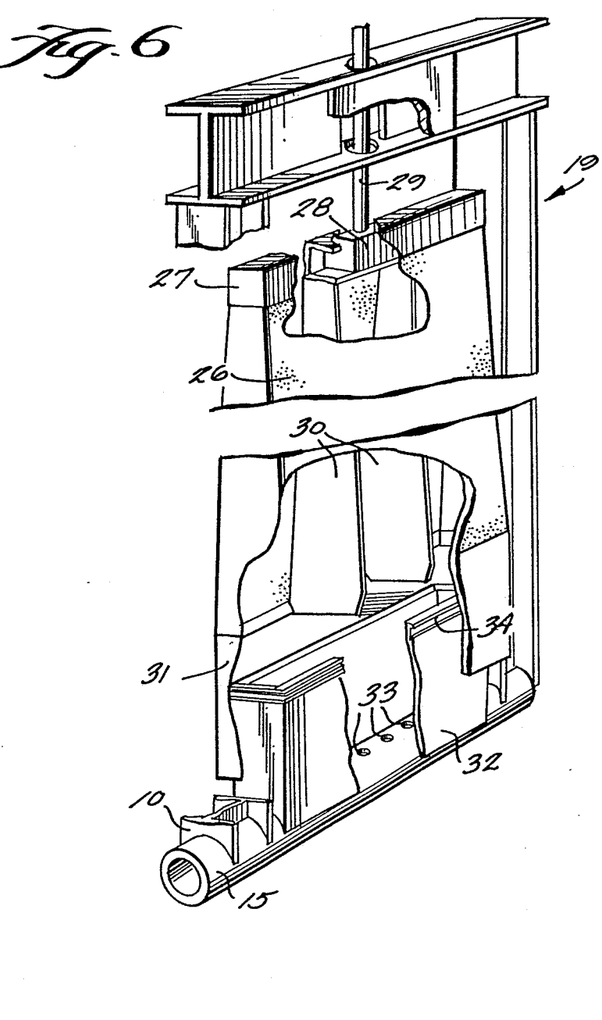
FIG. 6 is a schematic perspective view of just the screen of the assembly of FIG. 5, and related connections, with portions of the screen body cut away for clarity of illustration.
Figure 7:
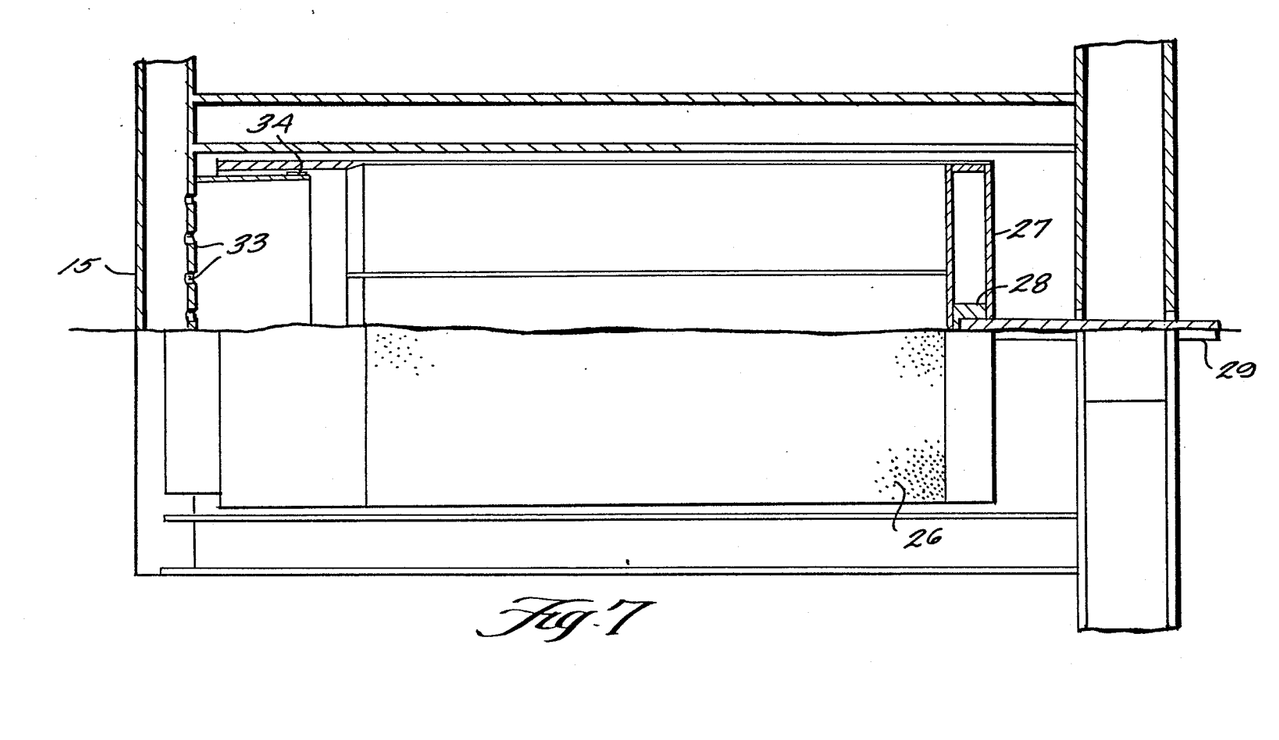
FIG. 7 is a part sectional, part elevational, side view of the screen illustrated in FIGS. 5 and 6.
Figure 8:
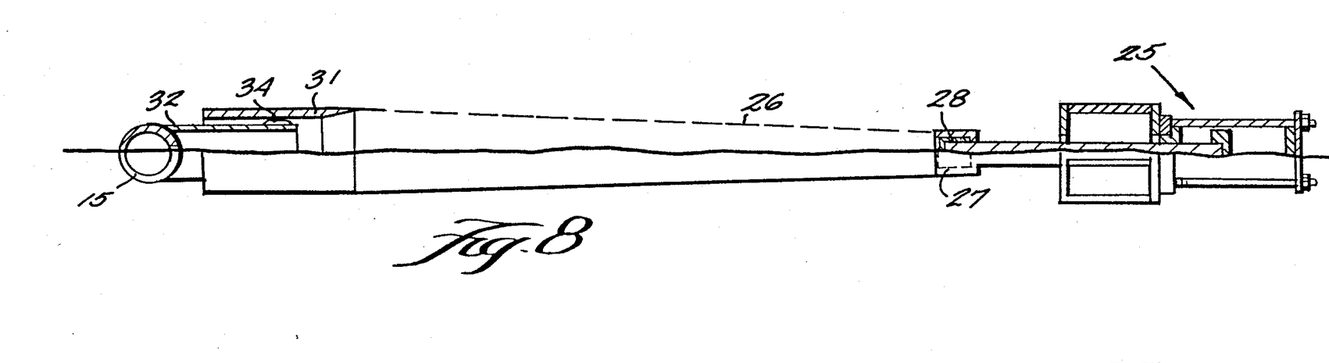
FIG. 8 is an end view, partly in cross-section and partly in elevation, of the screen of FIG. 7.

The tanks 10' illustrated in FIG. 4 are generally comparable to the tanks 10 except that they have rounded tops 37' and stand pipes 40. They do preferably contain the same components as the tank 10, including the self-cleaning reciprocating screens 19, carbon conduits 16, suction portion 36, draft tube 20, agitators 21, etc.

The self-cleaning screens according to the present invention may take a wide variety of different forms aside from that previously described. One such form is illustrated in FIGS. 10 through 14, another in FIG. 15, another in FIGS. 16 and 17, and a different approach to self-cleaning screens is illustrated in FIGS. 18 through 20.

Figure 2:
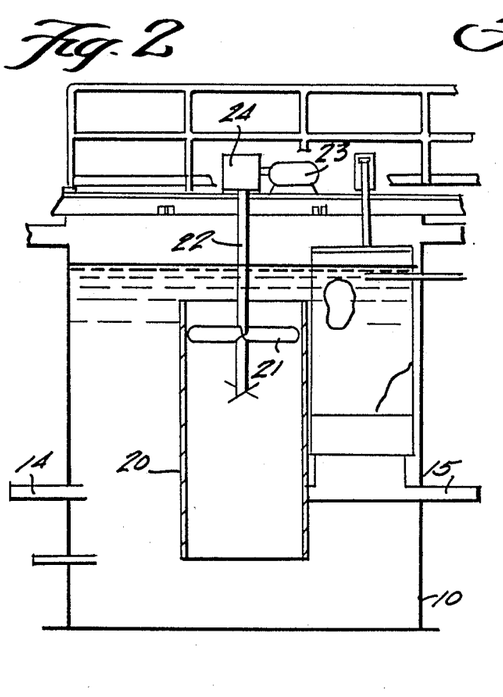
FIGS. 2 and 3 are side cross-sectional schematic views of an exemplary tank which comprises one of the components of the apparatus of FIG. 1.
Figure 3:
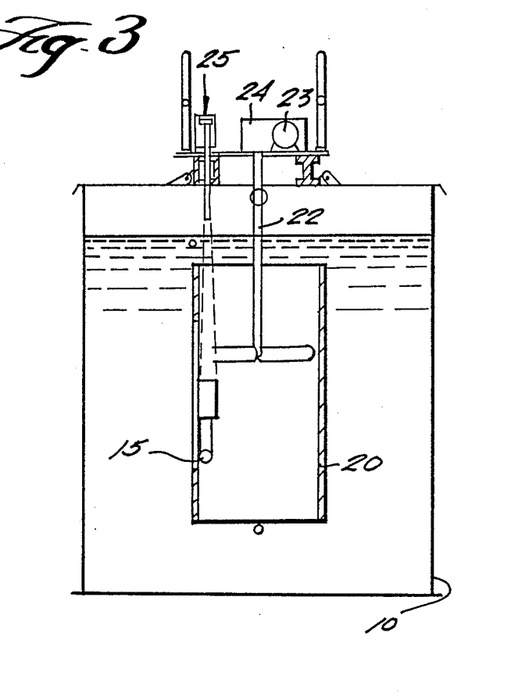

FIGS. 10 through 14 show a self-cleaning screen assembly 119 which is operatively connected to the slurry outlet tube 15 of the tank 10 illustrated in FIGS. 1 through 3, etc. In the FIGS. 10 through 14 embodiment like reference numerals correspond to like parts in the FIGS. 1 through 3, and 5 through 8 embodiment.

The major difference between the screen assembly 119 and the screen assembly 19 is the provision of gas relief means associated with the screen assembly 119. Such means preferably takes a form of a plurality of perforations 45 formed in the bottom of sleeve 27, and an additional number of perforations 46 formed in a side wall of the sleeve 27, both communicating with the interior of the screen body 26. The perforations 45, 46 are connected to a hollow reciprocating cylinder 47, which slides within the larger diameter cylinder 48, and which is connected to a gas relief passageway 49. A header 50 connects the bottom of hollow cylinder 47 to the perforations 46. In this way, any gas which passes into the hollow interior of screen body 26 is vented through tube 49.

Figures 13, 14, 15:
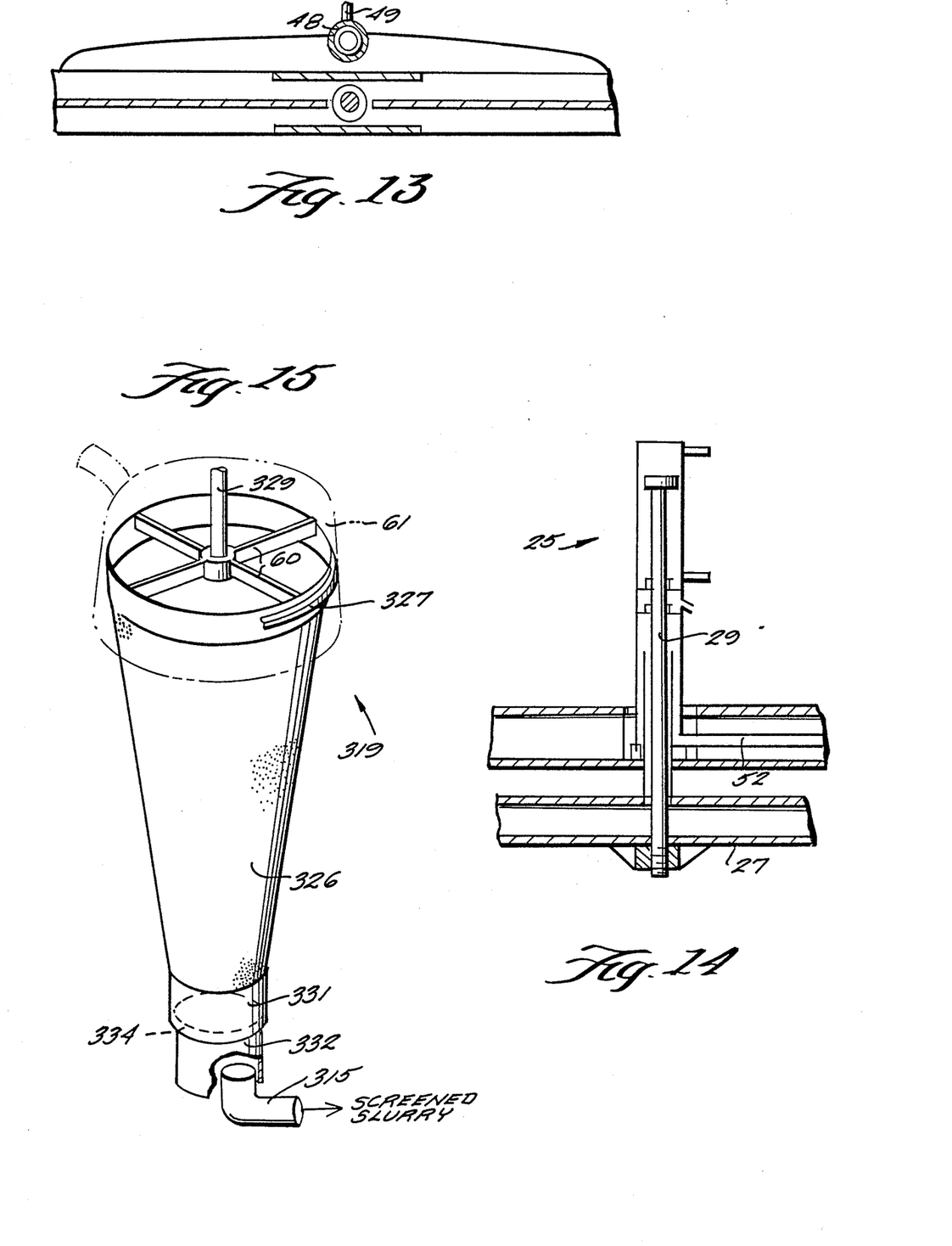
FIG. 14 is a detail view partly in cross-section and partly in elevation of a modified form of the device of FIGS. 10–13.
FIG. 15 is a perspective view of another exemplary form of screen according to the present invention.

FIG. 14 shows a modification of the apparatus of FIGS. 10 through 13 wherein the rod 29 is concentric with a gas vent tube 52. Perforations (not shown) in the sleeve 27 are operatively connected to the tube 52.

Figures 16, 17:
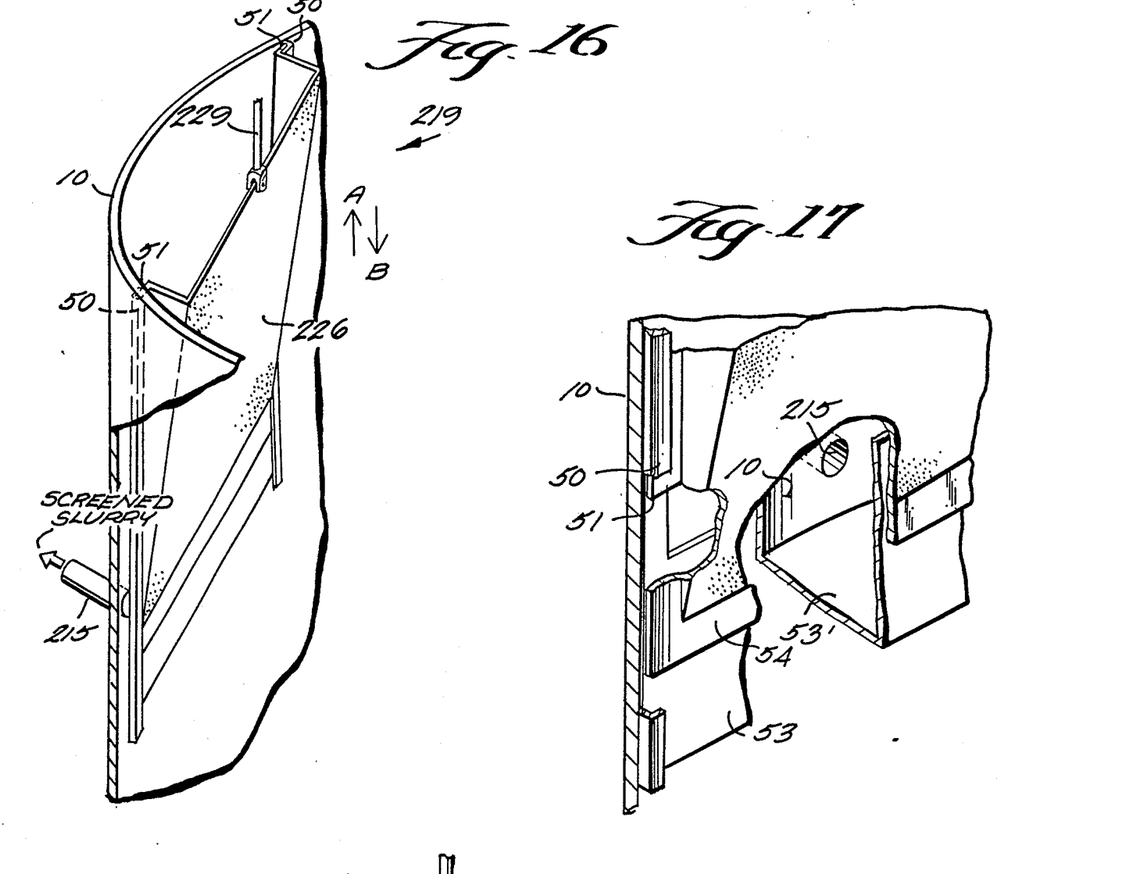
FIG. 16 is a schematic view of another exemplary screen according to the present invention.
FIG. 17 is a detail schematic perspective view of a portion of the screen of FIG. 16.

FIGS. 16 and 17 show a screen assembly 219, again functionally identical components to those in the other embodiments being illustrated by the same reference numeral, only in this case the reference numeral also being preceded by a "2".

The screen body 226 is open at the top thereof, and is connected by tie rod 229 to the reciprocating powered cylinder (not shown). The slurry outlet pipe 215 merely is operatively connected to the side wall of the tank 10, and need not extend a significant distance into the tank 10.

To guide the screen body 226 in reciprocation in directions A and B, the side screen guides, or retainers, 50 are provided. These structures have generally a channel-shape, and receive the planar edges 51 of the screen body 226. A bottom structure 53 is provided which closes off the bottom of the volume between the screen body 226 and the interior of the wall of the tank 10, the bottom of the screen body 226 having a planar solid portion 54 which slides along the interiormost portion of the bottom 53. The bottom 53 is continuous all the way to the tank wall, as illustrated by portion 53' thereof in FIG. 17. The screen 226 is reciprocated in the same way that the screen 26 is.

FIG. 15 illustrates another embodiment of the screen assembly according to the present invention. In FIG. 15 the screen assembly is illustrated generally by reference numeral 319. In this embodiment structures corresponding to like structures in the FIGS. 1 through 3, etc., embodiment are illustrated by the same reference numeral only preceded by a "3".

In this embodiment, a first bearing means 332 is provided at one end of the screen body 326, cooperating through polymeric material sealing and bearing ring 334 with the solid end termination 331 of the screen body 326. The bearing means 332 is circular in cross-section, having a first diameter, and cooperates with the conically shaped screen body 326. The tie rod 329 operatively connects the screen body 326 to the reciprocating cylinder (not shown), a spider connection 60 being provided between the tie rod 329 and the solid upper end 327 of the screen body 326.

Optionally, a second bearing means may also be provided associated with the screen body 326. The second bearing means, shown in dotted line in FIG. 15, comprises the second bearing 61 which is circular in cross-section and has a second diameter much greater than the first diameter (that is the diameter of the first bearing means 332). A comparable sealing and bearing ring (that is one comparable to the ring 334) is provided between the sleeve 327 and the second bearing 61, which is disposed exteriorly of the sleeve 327.

The embodiment illustrated in FIGS. 18 through 20 takes quite a different approach to screen cleaning than the other embodiments illustrated. In this embodiment, screen cleaning is not provided by back flushing, but rather is provided by a rotating component disposed interiorly of a cylindrical screen.

In the embodiment of FIGS. 18 through 20, the tank 70 has an ore slurry inlet 71 and an outlet 72, the outlet being disposed in the top 73 of the tank 70. A draft tube 74, generally comparable to the draft tube 20, is disposed concentrically in the interior of the tank 70 and has an open top and bottom. At the open top of the draft tube 74 the agitator or impeller blades 75 are provided, those blades being connected to a shaft 76 which rotates about a vertical axis, extending through guide 77 and pack box 78, and being rotated by motor 79 atop the tank 70. Surrounding the shaft 76, and concentric therewith, is the stationary hollow cylindrical screen 80 which, again, has perforations which are too large to allow the passage of the carbon or charcoal particles therethrough, but which do allow the passage of slurry therethrough. In order to effect self-cleaning of the screen 80, in FIG. 19, a plurality of generally vertically extending rotor blades 81 are provided, connected by radially extending bars 82 and the like to the shaft 76. Thus rotation of the shaft 76 effects self-cleaning of the screen 80 by relative rotation between the blades 81 and the stationary surface of the screen 80, and additionally effects circulation of slurry and/or particles within the tank 70, the impeller blades 75 drawing the slurry upwardly through the draft tube 74. Carbon particles to be recirculated to the prior tank in series can be expelled from adjacent the top of the screen, through conduit 84.

In the embodiment illustrated in FIG. 20, the components are identical to those illustrated in FIG. 19 except for the construction of the screen cleaning member. In this embodiment, the screen cleaning member which is connected to the shaft 76 for rotation therewith comprises the screw 85.

In the utilization of any of the apparatus heretofore described, in the recovery of gold and/or silver from a slurry of ore or the like, first leaching of the gold and/or silver from the ore or the like, to dissolve the gold and/or silver, is effected utilizing a basic cyanide solution; and then recovery of the leached gold and/or silver in solution by contacting the slurry with solid material (such as the carbon particles) for adsorbing the gold and/or silver from the solution, is practiced. The recovery step is facilitated by providing oxygen gas in the slurry in an amount significantly greater than can be obtained by contacting the slurry with air, as by introducing generally pure oxygen into the solution in contact with the adsorbing material. During practice of the method, the screens are continuously self-cleaned, either by back flushing or by relative rotation, as heretofore described.

It will thus be seen that according to the present invention an advantageous apparatus and method have been provided for CIL or CIP processes. While the invention has been herein shown and described in what is presently conceived to be the most practical and preferred embodiment thereof, it will be apparent to those of ordinary skill in the art that many modifications may be made thereof within the scope of the invention. For instance another type of agitator assembly, besides the draft tube, can be utilized. The scope of the invention is to be accorded the broadest interpretation of the appended claims so as to encompass all equivalent structures and procedures.

What is claimed is:

1. Apparatus for use in separating metal and other values from a slurry by adsorption with particles comprising:
    a tank for holding a slurry containing the values to be separated and a number of particles on which the values are to be adsorbed, said tank having a slurry outlet and a slurry inlet;
    screen means including a screen operatively connected to said slurry outlet for screening the slurry flowing into said outlet to permit slurry to flow into said outlet, but to prevent the particles from flowing into the slurry outlet, the screen having screen openings dimensioned so as to prevent the passage of a significant number of the particles therethrough, said slurry outlet comprising a generally linearly extending member having an opening along a wall thereof, bearing means carried by and along another wall of said member, said screen means including a screen body carrying said screen and having bearing means adjacent one end for engagement with said bearing means carried by said member; and
    means for linearly reciprocating said screen so as to provide a back flushing, self-cleaning, action thereto.

2. Apparatus as recited in claim 1 further comprising a draft tube disposed interiorly of said tank and extending along a generally vertical axis, and having an open top and open bottom; and means for facilitating circulation of slurry and/or particles from the bottom of the draft tube, through the top thereof.

3. Apparatus as recited in claim 1 further comprising gas relief means for allowing venting of gas from said screen means during reciprocation thereof to provide self-cleaning action.

4. Apparatus as recited in claim 1 wherein said means for reciprocating said screen means and said screen means comprise means for effecting transportation and concentration of the particles, said screen including a screen body having a tapered face in the dimension of reciprocation thereof; and further comprises a particles recirculation system suction pipe means having an inlet in said tank disposed adjacent a volume where concentration of particles occurs.

5. Apparatus for use in separating metal and other values from a slurry by adsorption with particles comprising:
    a tank for holding a slurry containing the values to be separated and a number of particles on which the values are to be adsorbed, said tank having a slurry outlet and a slurry inlet;
    screen means including a screen operatively connected to said slurry outlet for screening the slurry flowing into said outlet to permit slurry to flow into said outlet, but to prevent the particles from flowing into the slurry outlet, the screen having screen openings dimensioned so as to prevent the passage of a significant number of the particles therethrough, said slurry outlet comprising a generally linearly extending tubular member having a plurality of openings formed along the length of a first side thereof; and linear bearing means extending from said first side of said tubular member; and wherein said screen means comprises a hollow screen body perforated at the mid portion thereof, and having bearing means adjacent one end thereof for engagement with said bearing means extending from said tubular member; and a powered actuator operatively connected to said screen body for effecting reciprocation thereof, said actuation comprising means for linearly reciprocating said screen so as to provide a back flushing, self-cleaning, action thereto.

6. Apparatus as recited in claim 5 wherein said bearing means extending from said tubular member comprises a generally horizontally extending polymeric material bearing and sealing ring.

7. Apparatus as recited in claim 5 wherein said means for reciprocating said screen means comprises means for reciprocating said screen means slowly in a first direction, and then quickly in a second direction, opposite the first direction.

* * * * *